United States Patent
Sundberg et al.

(10) Patent No.: US 7,449,045 B2
(45) Date of Patent: Nov. 11, 2008

(54) METHOD OF HANDLING LIQUID NON-FERROUS METALS WITH REFRACTORY MATERIAL

(75) Inventors: Mats Sundberg, Västerås (SE); Jan-Olof Olsson, Halstahamar (SE); Chet Popilowski, Washington, CT (US)

(73) Assignees: Sandvik Intellectual Property AB, Sandviken (SE); Drexel University, Philadelphia, PA (US)

( * ) Notice: Subject to any disclaimer, the term of this patent is extended or adjusted under 35 U.S.C. 154(b) by 273 days.

(21) Appl. No.: 11/503,850

(22) Filed: Aug. 14, 2006

(65) Prior Publication Data

US 2007/0113706 A1    May 24, 2007

Related U.S. Application Data

(63) Continuation-in-part of application No. 10/168,011, filed on Oct. 16, 2002, now abandoned.

(30) Foreign Application Priority Data

Dec. 20, 1999  (SE) .................................. 9904670
Dec. 18, 2000  (WO) .................... PCT/SE00/02572

(51) Int. Cl.
    *C22B 9/16*    (2006.01)
    *B22D 41/02*   (2006.01)
(52) U.S. Cl. ........................... 75/409; 75/412; 266/280
(58) Field of Classification Search ................... 75/409, 75/412; 266/44, 280; 501/99
See application file for complete search history.

(56) References Cited

U.S. PATENT DOCUMENTS 6,312,570 B1 * 11/2001 Mroz, Jr. ................. 204/247.3

* cited by examiner

*Primary Examiner*—Roy King
*Assistant Examiner*—Janelle Morillo
(74) *Attorney, Agent, or Firm*—Alfred J. Mangels

(57) ABSTRACT

A method of handling liquid non-ferrous metals after smelting. The liquid metal is in contact with a solid refractory material, and in the absence of electrical currents passing through the liquid-metal-contacting surfaces. The solid material is $Ti_3SiC_2$. The liquid non-ferrous material can be aluminum or an aluminum alloy, magnesium or a magnesium alloy, or other non-ferrous materials as to which the $Ti_3SiC_2$ material is stable.

4 Claims, No Drawings

US 7,449,045 B2

METHOD OF HANDLING LIQUID NON-FERROUS METALS WITH REFRACTORY MATERIAL

CROSS-REFERENCE TO RELATED APPLICATIONS

This application is a continuation-in-part of application Ser. No. 10/168,011, having a filing date of Oct. 16, 2002, now abandoned and which is a U.S. National Phase application based upon International Application Serial No. PCT/SE00/02572, filed on Dec. 18, 2000, and identifying the United States as a Designated State.

BACKGROUND OF THE INVENTION

1. Field of the Invention

The present invention relates to a method of handling liquid non-ferrous metals after smelting, and more specifically to the solid material with which the liquid material comes into contact.

2. Description of the Related Art

There is a need for refractory material that can resist the aggressive conditions that occur when the material comes into contact with liquid non-ferrous metals, such as aluminum. Among other things, this need is due to the increasing use of aluminum in vehicle parts, such as chassis and cast engine parts. Material that is to be used in direct contact with liquid aluminum must possess good corrosion properties and good erosion properties and also have a high resistance to oxidation at high temperatures and against thermal shocks, and should also have high impact resistance and high strength and hardness. The material should also be capable of being easily worked into complex shapes at a competitive cost.

The aluminum industry uses at present silicon aluminum oxynitride, SIALON, despite its high manufacturing costs. One drawback with SIALON, however, is that it is brittle and therefore expensive to work.

SiC and $Si_3N_4$ are materials that have also been evaluated in contact with liquid aluminum. It was found that Si dissolved into liquid aluminum in both cases. $Si_3N_4$ was found to have the best resistance to corrosion when produced by hot isostatic pressing (HIP) of reaction-bound $Si_3N_4$ (HIPRBSN).

A dense protective layer was formed from AlN. SiC has been found to have low corrosion resistance when the material is manufactured by using silicon metal as a binding phase. Brittleness, difficulties in mechanical working, poor resistance against thermal shocks, low impact resistance, and reactions with liquid aluminum are among the drawbacks exhibited by SiC when used with liquid aluminum.

Generally speaking, the high affinity of Al to Si and the high solubility of Si in Al normally results in Si dissolving in liquid aluminum.

Some metallic materials, such as cast iron, have normally been used in conjunction with liquid aluminum, because these metals are inexpensive, have high mechanical strength, and resist thermal shocks. Cast iron protective pipes, however, are wetted by liquid aluminum, resulting in dissolving of the material with subsequent contamination of the melt with undesirable iron particles.

The aforesaid problems are solved by the present invention.

SUMMARY OF THE INVENTION

The present invention thus relates to a method of handling liquid non-ferrous metals, in which the liquid metal comes into contact with a solid refractory material, after smelting, and in the absence of electrical currents passing through the liquid-metal-contacting surfaces. The solid material is $Ti_3SiC_2$.

DESCRIPTION OF THE PREFERRED EMBODIMENTS

It has surprisingly and unexpectedly been found that this material ($Ti_3SiC_2$) is stable in liquid aluminum. It has been found that when in contact with liquid aluminum there is formed on the surface of the material a reaction zone which produces a layer that passivates the outer surface of said material and which prevents chemical corrosion in all essentials.

The material has therefore been found excellent in respect of handling liquid aluminum and aluminum alloys after smelting, and in the absence of electrical currents passing through the liquid-metal-contacting surfaces, such as would be present during electrochemical smelting of ore.

The material $Ti_3SiC_2$ has a unique combination of properties that render it suitable for high temperature applications. It has very good working properties, which enable complicated shapes to be produced. The material is also insensitive to thermal shocks. $Ti_3SiC_2$ is also a material that has high impact resistance and an equilibrium temperature between brittle and tough material of about 1200° C. The thermal conductivity of the material is about 37 W/mK at room temperature. The material can be produced by conventional methods of producing ceramic materials, such as extrusion, cold isostatic pressing (CIPing), casting, and packing by pressureless sintering, or by hot isostatic pressing (HIP). Minor fractions of TiC, SiC, and $TiSi_2$ may be present in the finished material.

The above-mentioned handling of the liquid material includes post-smelting handling and in the absence of electrical currents passing through the liquid-metal-contacting surfaces; retaining, such as when alloying; transportation; filtration, such as when degassing and purifying the material; or casting of the liquid material.

Aluminum has been mentioned above. According to a preferred embodiment, the liquid material is magnesium or magnesium alloys instead.

It is also conceivable to use successfully said material for other metals or metal alloys that have a relatively low melting point. Zinc, copper, tin and lead or their alloys are primarily intended in this respect.

The present invention is therefore not restricted to liquid material in the form of aluminum or magnesium, but can be applied with respect to other materials in which the material $Ti_3SiC_2$ is stable.

It will therefore be understood that the present invention is not restricted to the above-described embodiments thereof but variations can be made within the scope of the accompanying claims.

What is claimed is:

1. A method of handling liquid non-ferrous metals in a post-smelting operation, said method comprising the steps of:
    a) providing a non-ferrous metal in liquid form and after smelting, wherein the non-ferrous metal is selected from the group consisting of aluminum, aluminum alloys, magnesium, and magnesium alloys; and
    b) introducing the liquid non-ferrous metal into a casting device having liquid-metal-contacting surfaces formed from $Ti_3SiC_2$, and in the absence of electrical currents passing through the liquid-metal-contacting surfaces.

2. A method of handling liquid non-ferrous metals in a post-smelting operation, said method comprising the steps of:
a) providing a non-ferrous metal in liquid form and after smelting, wherein the non-ferrous metal is selected from the group consisting of aluminum, aluminum alloys, magnesium, and magnesium alloys; and
b) at least one of retaining the liquid metal in a container while it is in contact with liquid-metal-contacting surfaces formed from a solid refractory material, transporting the liquid metal while it is in contact with liquid-metal-contacting surfaces formed from a solid refractory material, and filtering the liquid metal through a filter having liquid-metal-contacting surfaces formed from a solid refractory material, wherein the solid refractory material is $Ti_3SiC_2$, and in the absence of electrical currents passing through the liquid-metal-contacting surfaces.

3. A method of handling non-ferrous metals in a post-smelting operation and in which the non-ferrous metals are in liquid form, said method comprising the steps of:
a. providing a solid refractory material surface for contact with the non-ferrous liquid metal, wherein the refractory material surface is $Ti_3SiC_2$; and
b. after smelting, handling the liquid non-ferrous metal by at least one of transporting, retaining, filtering, and casting the liquid non-ferrous material, wherein during handling the liquid non-ferrous metal is in contact with refractory material surfaces formed from $Ti_3SiC_2$, and in the absence of electrical currents passing through the liquid-metal-contacting surfaces.

4. A method according to claim 3, wherein the liquid non-ferrous metal is selected from the group consisting of aluminum, aluminum alloys, magnesium, magnesium alloys, zinc, zinc alloys, copper, copper alloys, tin, tin alloys, lead, lead alloys, and mixtures and combinations thereof.

* * * * *